United States Patent
Russon et al.

(10) Patent No.: US 7,146,026 B2
(45) Date of Patent: Dec. 5, 2006

(54) IMAGE CORRECTION SYSTEM AND METHOD

(75) Inventors: Virgil K. Russon, Greeley, CO (US); Scott C. Baggs, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1005 days.

(21) Appl. No.: 10/162,151

(22) Filed: Jun. 4, 2002

(65) Prior Publication Data
US 2003/0223635 A1 Dec. 4, 2003

(51) Int. Cl.
*G06K 9/00* (2006.01)

(52) U.S. Cl. .................................. 382/117; 382/167

(58) Field of Classification Search ............. 382/115, 382/117, 312, 305; 348/15
See application file for complete search history.

(56) References Cited

U.S. PATENT DOCUMENTS

| | | | |
|---|---|---|---|
| 5,231,674 A | 7/1993 | Cleveland et al. ............. 382/6 |
| 5,266,381 A | 11/1993 | Simon | |
| 5,432,863 A | 7/1995 | Benati et al. ................ 382/167 |
| 5,438,357 A * | 8/1995 | McNelley ................... 348/14.1 |
| 5,543,888 A * | 8/1996 | Sosa et al. ................... 396/158 |
| 5,748,764 A * | 5/1998 | Benati et al. ................ 382/117 |
| 5,990,973 A | 11/1999 | Sakamoto ................... 348/576 |
| 6,016,354 A | 1/2000 | Lin et al. ..................... 382/117 |
| 6,134,339 A | 10/2000 | Luo ........................... 382/115 |
| 6,278,491 B1 | 8/2001 | Wang et al. ................. 348/370 |
| 6,895,103 B1 * | 5/2005 | Chen et al. .................. 382/117 |
| 6,898,300 B1 * | 5/2005 | Iwaki ........................ 382/117 |

FOREIGN PATENT DOCUMENTS

| | | |
|---|---|---|
| JP | 2001197296 | 7/2001 |
| JP | 2002199202 | 7/2002 |

* cited by examiner

*Primary Examiner*—Kanjibhai Patel

(57) ABSTRACT

An image correction system comprises a processor adapted to receive an image. The system also comprises a modifier accessible by the processor and adapted to automatically modify the image to replace a closed eye of a subject within the image with an open eye.

32 Claims, 3 Drawing Sheets

IMAGE CORRECTION SYSTEM AND METHOD

TECHNICAL FIELD OF THE INVENTION

The present invention relates generally to the field of imaging systems and, more particularly, to an image correction system and method.

BACKGROUND OF THE INVENTION

One relatively familiar problem associated with photographs and other types of images is the phenomenon referred to as "red-eye." Flash photography is used to overcome under-exposure in relatively dark environments. Red-eye generally results from a person's pupils not being able to quickly adjust to the flash in the dark environment, thereby resulting in the light of the flash reflecting off the retina in the back of the eyes. Various systems and methods have been proposed to reduce or practically eliminate red-eye. These systems and methods may be used either during image collection, in conjunction with image processing, or both.

However, other problems associated with the eyes of a subject within an image may also be present. For example, the subject may blink during image collection, thereby resulting in the subject having closed eyes in the image. The subject may also glance away from a camera or other image collection device during image collection, thereby resulting in the subject's eyes being shifted away from looking directly at the image collection device. If a problem is detected during image collection, another image or photograph may be taken to obtain an image without the defect. However, additional images to correct the problems generally result in additional processing costs and material waste. Additionally, if the problem is not discovered until image processing, duplicate images may no longer be an option, thereby resulting in loss of the image.

SUMMARY OF THE INVENTION

In accordance with one embodiment of the present invention, an image correction system comprises a processor adapted to receive an image. The system also comprises a modifier accessible by the processor and adapted to automatically modify the image to replace a closed eye of a subject within the image with an open eye.

In accordance with another embodiment of the present invention, a method for image correction comprises receiving an image comprising at least one subject. The method also comprises automatically modifying the image to replace a closed eye of the subject with an open eye.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
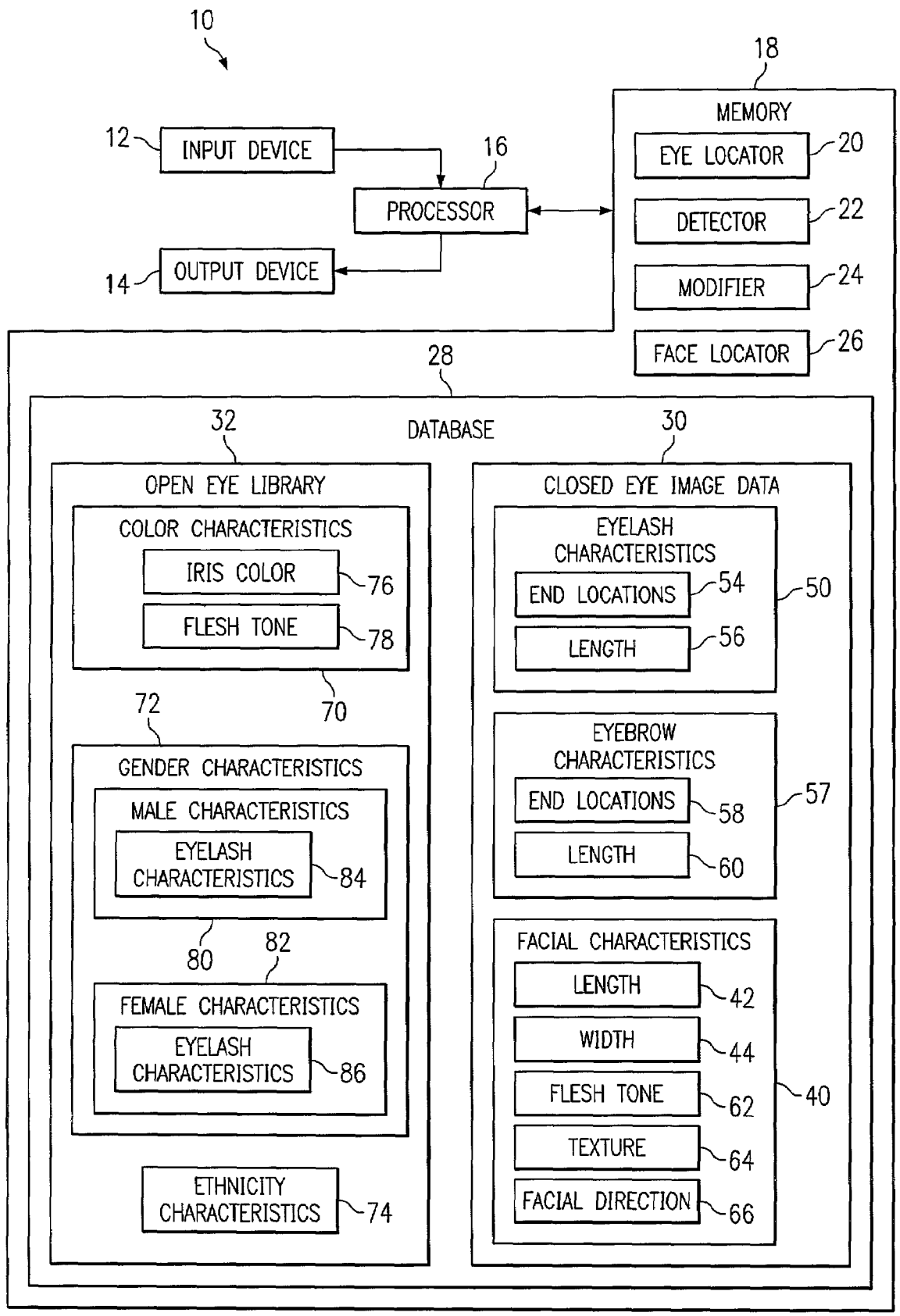
FIG. 1 is a diagram illustrating an image correction system in accordance with an embodiment of the present invention.
Figure 2:
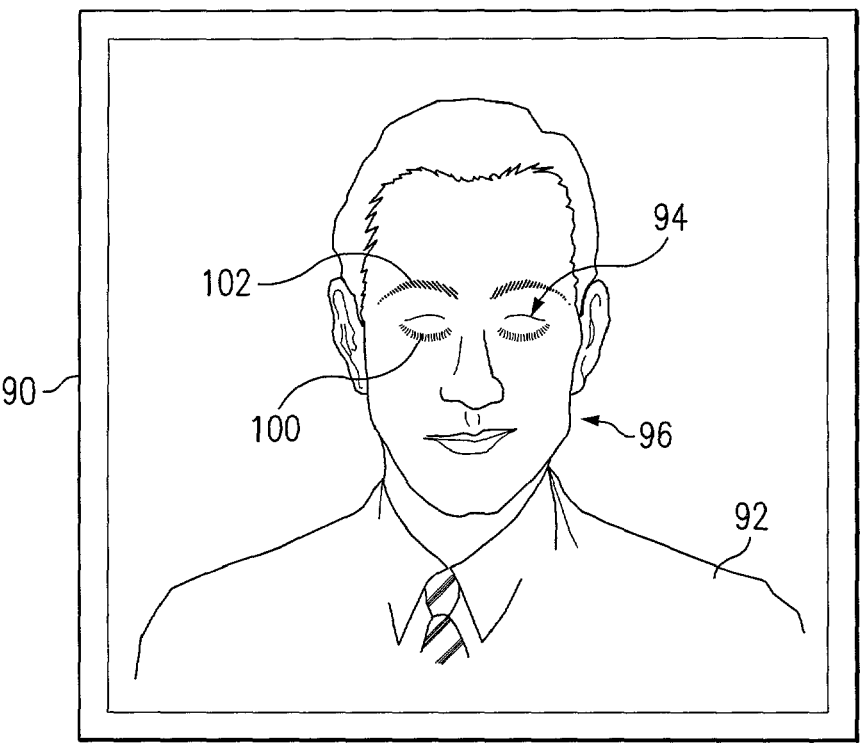
FIG. 2 is a diagram illustrating an image for image correction using the system illustrated in FIG. 1 in accordance with an embodiment of the present invention.
Figure 3:
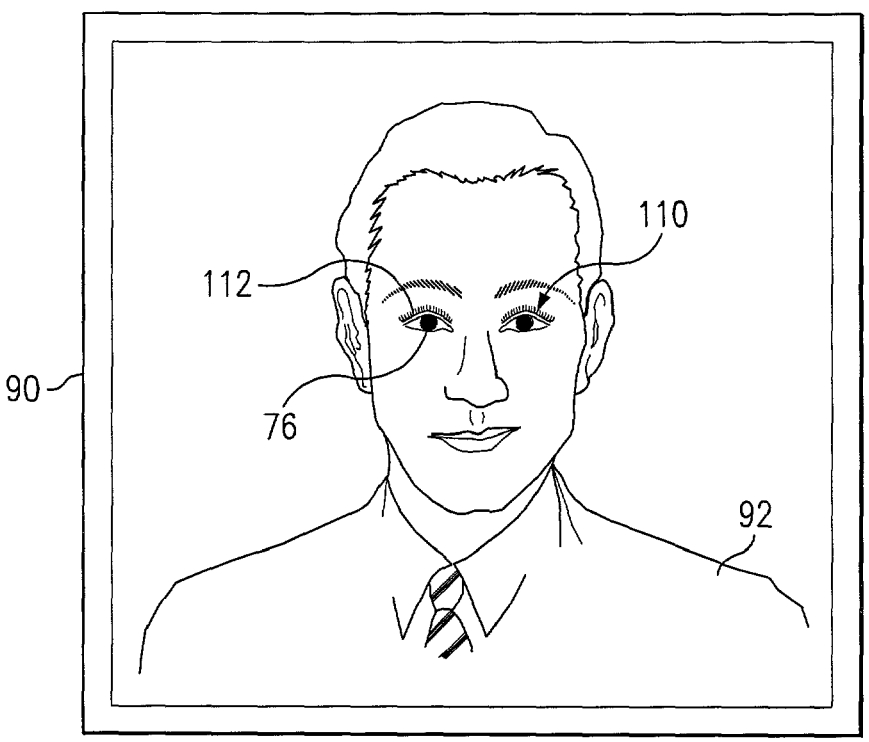
FIG. 3 is a diagram illustrating the image of FIG. 2 after image correction in accordance with an embodiment of the present invention.

The preferred embodiments of the present invention and the advantages thereof are best understood by referring to FIGS. 1–3 of the drawings, like numerals being used for like and corresponding parts of the various drawings.

FIG. 1 is a diagram illustrating an image correction system 10 in accordance with an embodiment of the present invention. Briefly, system 10 automatically replaces a closed eye of a subject within an image with an open eye. System 10 may be adapted to automatically determine whether the subject within the image has a closed eye or may be adapted to accommodate user selection of a particular subject or closed eye for image modification. For example, system 10 may be adapted to automatically locate a face of a subject within an image or accommodate user selection of a face of a particular subject within the image. After selection of the face and/or subject within the image, system 10 may be adapted to automatically locate the eyes of the subject and automatically determine whether a closed eye requires replacement with an open eye. System 10 may also be configured to provide a number of feature characteristics for the closed eye replacement that may be either automatically included in the replacement or selected by a user of system 10 for use in the replacement.

In the illustrated embodiment, system 10 comprises an input device 12, an output device 14, a processor 16, and a memory 18. Input device 12 may comprise a keyboard, a keypad, a pointing device such as a mouse or a track pad, an image collection device such as a scanner or digital camera, or other type of device for inputting information into system 10. Output device 14 may comprise a monitor, display, printer, or other type of device for generating an output.

In some embodiments, memory 18 comprises an eye locator 20, a detector 22, a modifier 24, and a face locator 26, which are computer software programs that may be executed by processor 16. In FIG. 1, locators 20 and 26, detector 22, and modifier 24 are illustrated as being stored in memory 18, where they can be executed by processor 16. However, locators 20 and 26, detector 22, and modifier 24 may be otherwise stored or located such that locators 20 and 26, detector 22, and modifier 24 are accessible by processor 16. Additionally, locators 20 and 26, detector 22, and modifier 24 may comprise software, hardware, or a combination of software and hardware.

In the illustrated embodiment, system 10 also comprises a database 28 stored in memory 18. Database 28 comprises information associated with correcting a closed eye of a subject within an image. For example, in the illustrated embodiment, database 28 comprises closed eye image data 30 and an open eye library 32. Information associated with the subject within the image is stored as closed eye image data 30. The closed eye within the image is then modified or replaced with an open eye using information contained within open eye library 32.

Briefly, in operation, system 10 may be configured such that face locator 26 automatically locates a face of a subject within an image. For example, face locator 26 may use pixel characteristics generally associated with defining or outlining a face of a subject within an image to locate a face of one or more subjects within the image. Thus, after receiving an image, face locator 26 may automatically locate and identify each face within the image for a determination of whether each subject within the image may have at least one closed eye. Alternatively, system 10 may be configured such that a user of system 10 may locate and select a particular face within an image using input device 12.

System 10 may also be configured such that eye locator 20 automatically locates at least one eye of a subject within the image. For example, detector 22 may acquire various characteristics associated with a face of a subject and store the acquired face characteristic data as facial characteristics 40 in database 28. As described above, system 10 may be adapted to automatically locate a face of a subject within the image or may be adapted to accommodate user selection of a particular face within the image. Facial characteristics 40 may comprise a length 42 and a width 44 of a face of a particular subject. Facial characteristics 40 may be determined based on pixel characteristics within the image or, alternatively, a user of system 10 may use input device 12 to select various features of a particular face to acquire facial characteristics 40. Based on length 42 and width 44 of a particular face, eye locator 20 may automatically locate and identify at least one eye of a subject within the image. Alternatively, a user of system 10 may locate and identify each eye of a particular subject using input device 12.

Detector 22 automatically determines whether an eye of a subject within an image is open or closed by acquiring various characteristics associated with the eye or proximate to the eye of a particular subject. In the illustrated embodiment, detector 22 acquires and stores eyelash line characteristics 50, eyebrow characteristics 57, and facial characteristics 40 which, either alone or in combination, may be used to determine whether an eye of a subject within an image is closed and which may also be used for replacing the closed eye with an open eye. For example, detector 22 may analyze pixel characteristics associated with an eyelash line of a subject which is generally formed slightly below a closed eye to determine whether a particular eye of a subject within the image is closed. Detector 22 may also use pixel characteristics associated with various patterns corresponding to either an open eye or closed eye to determine whether a particular subject within an image has a closed eye.

Detector 22 may also acquire end locations 54 and a length 56 of the eyelash line which, as will be described in greater detail below, may be used to select a satisfactory location for an open eye within the image. Additionally, detector 22 may locate and acquire information associated within an eyebrow of the subject within the image, such as end locations 58 and a length 60 of an eyebrow, which may also be used to select a satisfactory location within the image for the open eye. Detector 22 may also acquire various facial characteristics 40 of the subject for use in replacing a closed eye with an open eye such as, but not limited to, flesh tone 62 and texture 64 associated with a face of the subject and a facial direction 66 of the subject. For example, detector 22 may locate and identify an area within a forehead or other location of a face of the subject to obtain skin color and texture characteristics of the subject which may be used during replacement of the closed eye with the open eye. Detector 22 may also determine facial direction 66 of the subject within the image using length 42, width 44, or other characteristics within the image. For example, pixel characteristics of the image indicating shadowing may be used to determine which direction the subject is facing within the image. Additionally, eyelash line and eyebrow characteristics 50 and 57, such as the locations of the eyebrow and eyelash line relative to the face of the subject, may be used to determine which direction the subject is facing within the image. Facial direction 66 may then be used to properly locate and size the replacement open eye within the image.

Modifier 24 is used to replace a closed eye within the image with an open eye using information contained within closed eye image data 30 and/or open eye library 32. For example, open eye library 32 comprises information associated with various characteristics of an open eye used to replace a closed eye within the image. One or more characteristics associated with the open eye may be selected by a user of system 10 or automatically selected by modifier 24 for the closed eye replacement. For example, if the subject within the image is relatively small, thereby resulting in a relatively small image of an eye of the subject, modifier 24 may automatically replace a closed eye of the subject with an open eye with little or no user intervention because various characteristics associated with the replacement open eye may be minimally noticeable within the image. However, as a size of the eye increases, additional characteristics may be required related to an open eye for satisfactory replacement corresponding to the particular subject within the image.

In operation, modifier 24 may determine the relative size of a face of a subject within the image using facial characteristics 40 acquired by detector 22, such as length 42 and width 44 of a particular face within the image. Based on length 42 and width 44, modifier 24 may determine that any image of an open eye from open eye library 32 may be a satisfactory replacement for a closed eye. If, however, modifier 24 determines that additional characteristics associated with the open eye are required to suitably replace a closed eye, one or more characteristics may be selected from open eye library 32. For example, in the illustrated embodiment, open eye library 32 comprises color characteristic 70, gender characteristic 72, and ethnicity characteristic 74.

In operation, color characteristics 70 such as iris color 76 may be selected by modifier 24 to obtain a satisfactory iris color for the open eye. Iris color 76 may comprise a spectrum of available colors which may be selected by a user of system 10 for the iris color of the open eye. System 10 may also be adapted to acquire iris color 76 for the open eye from an open eye of the subject within the image. For example, if one of the eyes of the subject within the image is open, detector 22 may be used to acquire iris color 76 from the open eye to be used during closed eye replacement. Additionally, modifier 24 may access facial characteristics 40, such as flesh tone 62 acquired by detector 22, to determine an appropriate flesh tone 78 for various skin portions of the replacement open eye. For example, when substituting the closed eye with the open eye, skin areas within the image proximate to the eye, such as eyelid and other skin features, may also require reconstruction. Thus, modifier 24 generates and blends portions of the replacement open eye into adjacent portions of the image proximate to the replacement open eye.

Gender characteristics 72 such as male characteristics 80 and female characteristics 82 may also be selected by modifier 24 corresponding to a particular subject within the image. For example, eyelash characteristics 84 and 86 may be selected corresponding to either a male or female subject, respectively, to obtain a satisfactory replacement open eye. Eyelash characteristics 84 and 86 may include eyelash thickness, eyelash length, eyelash curl, and other associated characteristics corresponding to the eyelash of a particular subject to obtain a satisfactory open eye replacement. Gender characteristics 72 may be automatically selected based on information obtained by detector 22 or may be selected by a user of system 10 using input device 12.

Modifier 24 may also select ethnicity characteristics 74 corresponding to a particular subject within the image to obtain a satisfactory open eye replacement. For example, shape and other characteristics of an eye may vary depending on the ethnicity of the subject within the image. Thus, depending on the ethnicity of the subject within the image, modifier 24 may be used to select a satisfactory open eye replacement for the particular subject. Ethnicity characteristics 74 may be automatically selected based on information obtained by detector 22 or may be selected by a user of system 10 using input device 12.

Modifier 24 may also size and locate the replacement open eye using facial direction 66. For example, depending on the direction the subject is facing within an image, the shape and location of the eye relative to the face of the subject may vary. Accordingly, modifier 24 modifies a shape of the replacement open eye using facial direction 66. Modifier 24 may also select a location for the open eye within the image using facial direction 66.

FIGS. 2 and 3 are diagrams illustrating an image 90 before and after correction, respectively, using system 10 in accordance with an embodiment of the present invention. As illustrated in FIGS. 2 and 3, image 90 comprises a single subject 92. However, it should be understood that system 10 may also be used to correct images containing multiple subjects 92. As best illustrated in FIG. 2, subject 92 comprises two closed eyes 94. As described above, face locator 26 may be used to automatically locate a face 96 of subject 92, and eye locator 20 may be used to automatically locate eyes 94 of subject 92. Alternatively, a user of system 10 may use input device 12 to select a particular subject 92 and particular eyes 94 of subject 92 within image 90.

As described above, detector 22 analyzes image 90 to determine whether a particular subject 92 within image 90 has at least one closed eye 94. In operation, detector 22 may identify an eyelash line 100 of subject 92 formed by the closing of an eye. For example, detector 22 may be configured to locate and identify eyelash line 100 based on predetermined pixel values and characteristics associated with a closed eye.

Detector 22 also acquires additional information corresponding to subject 92 and eyes 94 which may be used for locating the replacement open eye and for selecting various features associated with the replacement open eye. For example, as briefly described above, detector 22 may obtain eyelash line characteristics 50 such as end locations 54 and length 56 which may be used by modifier 24 to determine a satisfactory location for the replacement open eye. Detector 22 may also locate and identify an eyebrow 102 of subject 92 using predetermined pixel values generally associated within an eyebrow of a subject. Accordingly, detector 22 may also acquire eyebrow characteristics 57 such as end locations 58 and length 60 which may be used by modifier 24 to satisfactorily locate the replacement open eye. Detector 22 may also obtain facial characteristics 40 such as flesh tone 62 and texture 64 which may be used by modifier 24 for satisfactorily replacing the closed eyes 94.

As briefly described above, detector 22 may also obtain facial characteristics 40 such as length 42 and width 44 to determine the level of characteristics required for the replacement open eye. For example, as a size of subject 92 decreases within image 90, less detail and characteristics may be required to satisfactorily replace closed eyes 94. However, as the size of subject 92 increases within image 90, additional levels of detail and characteristics associated with the replacement open eye may be required to satisfactorily replace closed eyes 94.

After detector has determined that subject 92 comprises at least one closed eye 94, modifier 24 may be used to replace the closed eye 94 with an open eye 110. As briefly described above, if the size of subject 92 is relatively small within image 90, modifier 24 may automatically replace the closed eye 94 with any replacement open eye 110 selected from open eye library 32. For example, if subject 92 is located a generally great distance from an image collection device, such as a camera, particular characteristics of an eye may not be discernable within image 90. However, as will be described in greater detail below, as the size of subject 92 and, correspondingly, the eyes of subject 92, increase within image 90, additional features and characteristics associated with the eyes of subject 92 may be required to satisfactorily replace closed eyes 94.

Modifier 24 uses eyelash line characteristics 50 and/or eyebrow characteristics 57 to locate the open eye 110 on subject 92. For example, modifier 24 may use end locations 54 and/or length 56 of eyelash line 100 of subject 92 to determine a location on face 96 for open eye 110. Modifier 24 may also use end locations 58 and/or length 60 of eyebrow 102 of subject 92 to determine the location for open eye 110. Modifier 24 also sizes open eye 110 using one or more facial characteristics 40. For example, modifier 24 may use length 42 and/or width 44 to determine an appropriate size of open eye 110 corresponding to the size of face 96 of subject 92. The sizing of open eye 110 may also be based on eyelash line characteristics 50 and/or eyebrow characteristics 57.

As briefly described above, modifier 24 may also be used to select various characteristics associated with open eye 110 to obtain a satisfactory replacement for image 90. For example, modifier 24 may be used to select color characteristics 70, gender characteristics 72, and ethnicity characteristics 74 corresponding to a particular subject 92 within image 90. Thus, particular characteristics associated with open eye 110 may be selected with particularity, thereby tailoring open eye 110 to the particular subject 92.

In the illustrated embodiment, modifier 24 may be used to select a particular iris color 76 corresponding to subject 92 for the replacement open eye 110. Modifier 24 may also be used to select ethnicity characteristics 74 corresponding to subject 92. For example, various features and characteristics of open eye 110 may be modified, such as shape and location, based on an ethnic background of subject 92. As described above, system 10 may be adapted to automatically select iris color 76 and/or ethnicity characteristics 74 based on information obtained by detector 22 or iris color 76 and/or ethnicity characteristics 74 may be selected by a user of system 10 using input device 12.

Modifier 24 may also be used to select one or more gender characteristics 72 corresponding to the particular subject 92. For example, in the illustrated embodiment, one or more female characteristics 82 may be selected, such as eyelash characteristics 86, to obtain a satisfactory replacement open eye 110. Eyelash characteristics 86 may include thickness, length, amount of curl, and other features to modify the open eye 110 for the particular subject 92. As described above, system 10 may be adapted to automatically select gender characteristics 72 based on information obtained by detector 22 or gender characteristics 72 may be selected by a user of system 10 using input device 12.

Modifier 24 also uses one or more facial characteristics 40 acquired by detector 22 to smooth and/or blend various features of the replacement open eye 110 into face 96 of subject 92. For example, during replacement of a closed eye 94, eyelid portions 112 and other facial features proximate to open eye 110 are generated by modifier 24. Modifier 24 may retrieve flesh tone 62 and texture 64 acquired by detector 22 to obtain color and texture characteristics with various skin portions generated corresponding to open eye 110. Eyelid portions 112 and other skin features proximate to open eye 110 are then generated and blended into adjacent areas of face 96 within image 90 proximate to open eye 110.

Thus, the present invention provides an efficient and cost-effective solution for correcting images, thereby substantially reducing or eliminating a requirement for duplicate images. For example, the present invention may be used during image processing to correct closed eyes in images. In an image processing application, for example, a user may have the option of configuring system 10 to automatically locate, detect and/or replace a closed eye with an open eye, or the user may configure system 10 to automatically replace a closed eye with an open eye after manually selecting features within the image, such as a particular subject or face, or after manually selecting various characteristics associated with the replacement open eye, such as iris color or gender-specific characteristics. The present invention may also be incorporated into an image-capturing device, such as a digital camera, for real time image correction.

Figure 4:
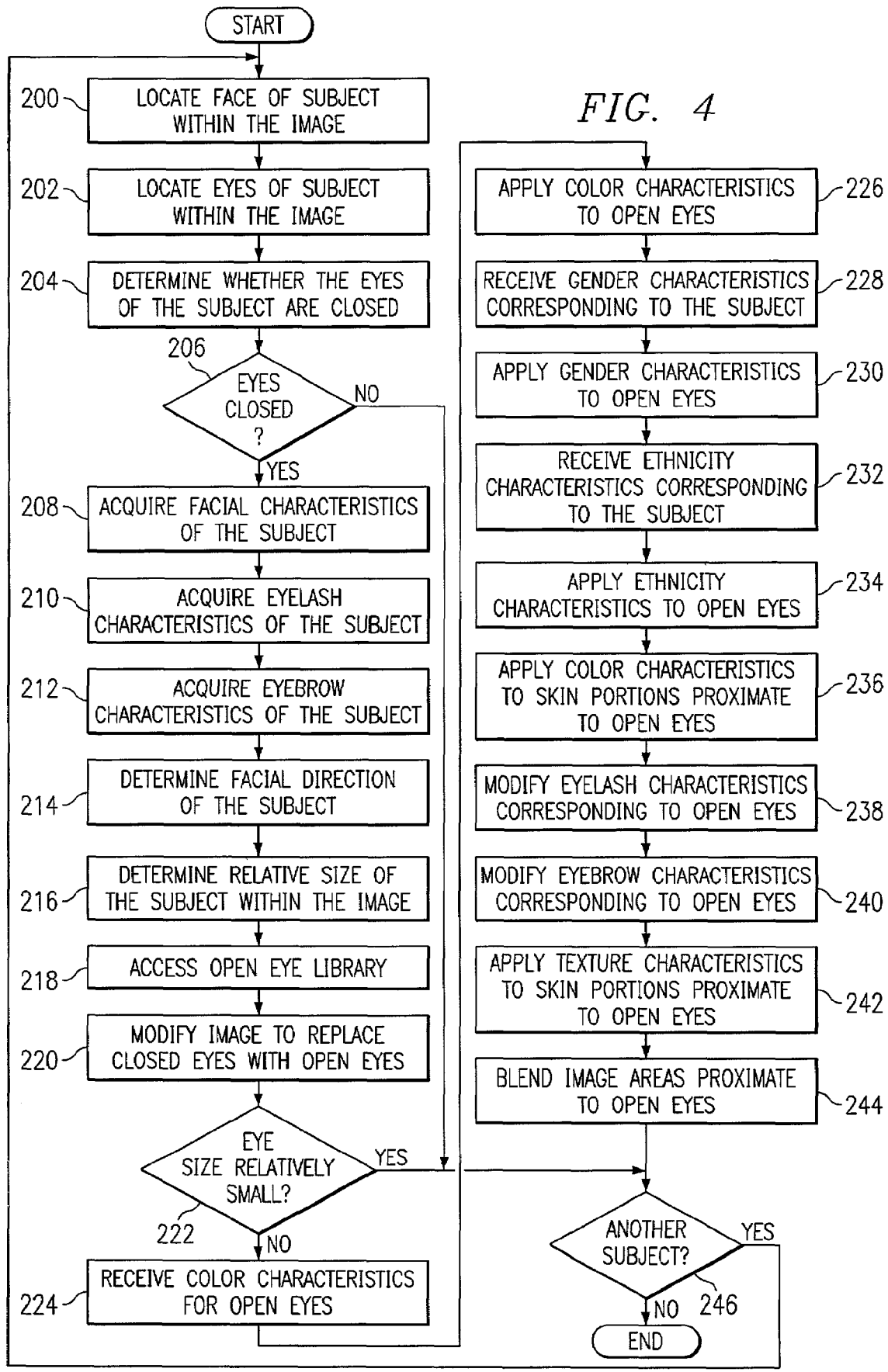
FIG. 4 is a flow chart illustrating a method for image correction in accordance with an embodiment of the present invention.

FIG. 4 is a flow chart illustrating a method for image correction in accordance with an embodiment of the present invention. The method begins at step 200, where face locator 26 automatically locates and identifies face 96 of subject 92. At step 202, eye locator 20 automatically locates and identifies locations for the eyes of subject 92 within image 90. As described above, pixel characteristics or other features associated with image 90 may be used to locate and identify face 96 and the eyes of subject 92 within image 90.

At step 204, detector 22 determines whether subject 92 has at least one closed eye 94. For example, detector 22 may detect eyelash line 100 indicating that subject 92 has at least one closed eye 94. At decisional step 206, if subject 92 does not have at least one closed eye 94, the method proceeds to step 246. If subject 92 does have at least one closed eye 94, the method proceeds from step 206 to step 208, where detector 22 acquires facial characteristics 40 corresponding to subject 92. For example, detector 22 may acquire length 42 and width 44 of face 96. Detector 22 may also acquire flesh tone 62 and texture 64 corresponding to skin portions of subject 92.

At step 210, detector 22 acquires eyelash characteristics 50 corresponding to subject 92, such as end locations 54 and length 56. At step 212, detector 22 acquires eyebrow characteristics 57 corresponding to subject 92, such as end locations 58 and length 60. At step 214, detector 22 determines facial direction 66 of subject 92. For example, facial characteristics 40 such as length 42 and width 44 may be used to determine facial direction 66. Eyelash characteristics 50 and/or eyebrow characteristics 57 may also be used to determine facial direction 66.

At step 216, detector 22 determines a size of subject 92 relative to image 90 for determining a level of characteristics required to replace closed eye(s) 94. Facial characteristics 40 such as length 42 and width 44 may be used to determine a relative size of subject 92. Eyelash characteristics 50 such as length 56 and and/or eyebrow characteristics 57 such as length 60 may also be used to determine a relative size of subject 92. At step 218, modifier 24 accesses open eye library 32 to select open eye(s) 110 for replacing closed eye(s) 94. At step 220, modifier 24 modifies image 90 replacing closed eye(s) 94 with open eye(s) 110.

At decisional step 222, if replacement open eye(s) 110 are relatively small compared to image 90, the level of characteristics necessary to satisfactorily replace closed eye(s) 94 may be minimal and, therefore, the method may proceed to step 246. If replacement open eye(s) 110 are not relatively small compared to image 90, additional characteristics may be necessary to satisfactorily replace closed eye(s) 94 and, therefore, the method proceeds from step 222 to step 224, where modifier 24 receives color characteristics 70 corresponding to open eye(s) 110. For example, iris color 76 may be received from a user of system 10 via input device 12. At step 226, modifier 24 applies color characteristics 70, such as iris color 76, to open eye(s) 110.

At step 228, modifier 24 receives gender characteristics 72 corresponding to subject 92. For example, a gender of subject 92 may be received from a user of system 10 via input device 12. At step 230, modifier 24 applies gender characteristics 72 to open eye(s) 110. For example, eyelash characteristics 84 or 86 may be applied to open eye(s) 110 corresponding to either male characteristics 80 or female characteristics 82, respectively.

At step 232, modifier 24 receives ethnicity characteristics 74 corresponding to subject 92. For example, a particular ethnicity associated with subject 92 may be received from a user of system 10 via input device 12. At step 234, modifier 24 applies ethnicity characteristics 74 to open eye(s) 110. At step 236, modifier applies color characteristics 70 corresponding to eyelid portions 112 proximate to open eye(s) 110. For example, modifier 24 may apply flesh tone 78 to skin portions proximate to open eye(s) 110.

At step 238, modifier 24 modifies eyelash characteristics of subject 92 within image 90. For example, modifier 24 may modify a shape or location of the eyelash(es) of subject 92 corresponding to open eye(s) 110. At step 240, modifier 24 modifies eyebrow characteristics of subject 92 within image 90. For example, modifier 24 may modify a shape or location of the eyebrow of subject 92 corresponding to open eye(s) 110. At step 242, modifier 24 applies texture characteristics to skin portions proximate to open eye(s) 110. For example, modifier 24 may access texture 64 acquired by detector 22 and apply texture 64 to eyelid portion(s) 112 and other skin portion(s) modified corresponding to open eye(s) 110.

At step 244, modifier 24 blends portions of image 90 proximate to open eye(s) 110 into adjacent portions of image 90 to obtain a smooth transition between modified and unmodified portions of image 90. At decisional step 246, a determination is made whether another subject within image 90 requires correction. If another subject within image 90 requires correction, the method returns to step 200. If another subject within image 90 does not require correction, the method ends.

What is claimed is:

1. An image correction system, comprising:
   a processor adapted to receive an image;
   a detector configured to automatically detect a closed eye of a subject within the image; and
   a modifier accessible by the processor and adapted to automatically modify the image to replace the closed eye within the image with an open eye.

2. The system of claim 1, wherein the detector is adapted to determine a characteristic of an eyelash line of the subject to detect the closed eye.

3. The system of claim 1, wherein the modifier is adapted to replace the closed eye with the open eye having a characteristic associated with the group consisting of gender characteristics, color characteristics, and ethnicity characteristics.

4. The system of claim 1, further comprising a locator accessible by the processor and adapted to automatically locate a face of the subject within the image.

5. The system of claim 1, wherein the detector is configured to determine at least one facial characteristic associated with the subject.

6. The system of claim 5, wherein the modifier is adapted to replace the closed eye using the facial characteristic.

7. The system of claim 1, wherein the modifier is adapted to apply a color characteristic associated with the open eye.

8. The system of claim 1, wherein the modifier is adapted to apply an iris color to the open eye.

9. The system of claim 1, wherein the modifier is adapted to apply a flesh tone color characteristic associated with the open eye.

10. The system of claim 1, wherein the modifier is further adapted to select the open eye from a library.

11. A method for image correction, comprising:
receiving an image comprising at least one subject;
automatically detecting a closed eye of a subject within the image; and
automatically modifying the image to replace the closed eye with an open eye.

12. The method of claim 11, wherein detecting comprises detecting an eyelash line of the closed eye.

13. The method of claim 11, further comprising automatically detecting a face of the subject within the image.

14. The method of claim 11, further comprising selecting the open eye from a library.

15. The method of claim 11, further comprising detecting at least one facial characteristic associated with the subject.

16. The method of claim 11, further comprising applying a characteristic to the open eye selected from the group consisting of gender characteristics, color characteristics, and ethnicity characteristics.

17. The method of claim 11, further comprising applying an iris color to the open eye.

18. The method of claim 11, further comprising applying a flesh tone corresponding to the subject to skin portions adjacent to the open eye.

19. An image correction system, comprising:
a library comprising at least one image of an open eye;
a detector accessible by a processor and configured to automatically detect a closed eye of a subject within an image based at least in part on an eyelash line of the subject; and
a modifier accessible by the processor and adapted to replace the closed eye on the subject with at least one the image of the open eye.

20. The system of claim 19, wherein the image of the open eye comprises a characteristic selected from the group consisting of gender characteristics, color characteristics, and ethnicity characteristics.

21. The system of claim 19, wherein the modifier is adapted to apply a color characteristic to the image of the open eye.

22. The system of claim 21, wherein the color characteristic comprises an iris color.

23. The system of claim 21, wherein the color characteristic comprises a flesh tone associated with a skin portion of the subject adjacent the open eye.

24. The system of claim 19, wherein the modifier is adapted to modify a size of the open eye corresponding to a facial direction of the subject.

25. An image correction system, comprising:
means for receiving an image having at least one subject;
means for automatically detecting a closed eye of the at least one subject within the image; and
means for modifying the image to replace the closed eye with an open eye.

26. The system of claim 25, further comprising means for automatically locating a face of the subject within the image.

27. The system of claim 25, wherein the detecting means comprises means for automatically identifying an eyelash line corresponding to the closed eye.

28. The system of claim 25, further comprising means for applying a characteristic to the open eye selected from the group consisting of gender characteristics, color characteristics, and ethnicity characteristics.

29. The system of claim 25, further comprising means for sizing the open eye corresponding to a facial direction of the subject within the image.

30. The system of claim 25, further comprising means for detecting at least one facial characteristic associated with the subject.

31. The system of claim 30, further comprising means for modifying the image using the facial characteristic.

32. The system of claim 25, further comprising means for retrieving an image of the open eye from a library.

* * * * *

UNITED STATES PATENT AND TRADEMARK OFFICE
CERTIFICATE OF CORRECTION

PATENT NO.         : 7,146,026 B2                                         Page 1 of 1
APPLICATION NO. : 10/162151
DATED              : December 5, 2006
INVENTOR(S)        : Virgil K. Russon et al.

It is certified that error appears in the above-identified patent and that said Letters Patent is hereby corrected as shown below:

In column 10, line 2, in Claim 19, after "with" insert -- the --.

In column 10, line 3, in Claim 19, delete "the" before "image".

Signed and Sealed this

Fifth Day of May, 2009

JOHN DOLL
*Acting Director of the United States Patent and Trademark Office*